United States Patent [19]
Wille et al.

[11] Patent Number: 5,905,734
[45] Date of Patent: May 18, 1999

[54] TIME SLOT INTERCHANGER AND DIGITAL COMMUNICATIONS TERMINAL FOR ISDN D-CHANNEL ASSEMBLY

[75] Inventors: David G. Wille, Plano, Tex.; Kay B. Magleby, Coolin, Id.

[73] Assignee: Alcatel USA Sourcing, L.P., Plano, Tex.

[21] Appl. No.: 08/759,390

[22] Filed: Dec. 4, 1996

[51] Int. Cl.⁶ .................................................. H04J 3/16
[52] U.S. Cl. .......................................... 370/524; 370/376
[58] Field of Search ..................................... 370/375, 376, 370/377, 524, 378, 420, 419, 351, 530, 401, 264, 265, 381, 379, 476, 522; 379/201, 207, 419

[56] References Cited

U.S. PATENT DOCUMENTS

| | | | |
|---|---|---|---|
| 3,740,483 | 6/1973 | Pedersen | 370/376 |
| 5,157,656 | 10/1992 | Turudic et al. | 370/379 |
| 5,640,387 | 6/1997 | Takahashi et al. | 370/376 |

OTHER PUBLICATIONS

M.J.M. Forbes et al. Integrated Access: The Achievement of a Vision, IEEE 2081–2086, 1991.

Arvidson et al., A Generic Digital Switch Interface (TR–303) For Local Access, IEEE 2087–2091, 1991.

Kim et al, Flexibility and Quality in the Access Network, IEEE 1864–1868, 1992.

Bellcore Information, Bellcore: GR–303 Integrated Access Plateforms, Mar. 3, 1998.

*Primary Examiner*—Jason Chan
*Assistant Examiner*—Jasper Kwoh
*Attorney, Agent, or Firm*—Baker & Botts, L.L.P.

[57] ABSTRACT

The invention comprises a time slot interchanger and method for multiplexing ISDN D-channel signals into multiplexed signals in a digital communications terminal. The method comprises receiving a frame of communication signals wherein some of the communication signals represent ISDN D-channel signals. The frame of communication signals is stored in memory during a first frame period. During a second frame period, at least some of the stored communication signals are retrieved from memory. Multiplexed signals are assembled wherein each multiplexed signal comprises a multiplexed combination of the data bits of ISDN D-channel signals retrieved from memory. The multiplexed signals are then output during a second frame period.

21 Claims, 2 Drawing Sheets

TIME SLOT INTERCHANGER AND DIGITAL COMMUNICATIONS TERMINAL FOR ISDN D-CHANNEL ASSEMBLY

CROSS REFERENCE TO RELATED APPLICATIONS

This application is related to U.S. application Ser. No. 08/254,000, filed on Dec. 4, 1996, by David G. Wille, et al., attorney's docket number 036560.5283, and entitled, "Time Slot Interchanger and Digital Communications Terminal for ISDN D-Channel Assembly".

This application is related to U.S. application Ser. No. 08/759,187, filed on Dec. 4, 1996, by David G. Wille, et al., attorney's docket number 036560.5284, and entitled, "Time Slot Interchanger and Digital Communications Terminal for ISDN D-Channel Assembly".

This application is related to U.S. application Ser. No. 08/750,391, filed on Dec. 4, 1996, by David G. Wille, attorney's docket number 036560.5285, and entitled, "Time Slot Interchanger and Digital Communications Terminal for ISDN D-Channel Assembly."

TECHNICAL FIELD OF THE INVENTION

This invention relates generally to telecommunications and more particularly to a method and apparatus for multiplexing ISDN D-channel signals in a digital communications terminal.

BACKGROUND OF THE INVENTION

Bellcore has developed a series of requirements for telecommunications equipment manufacturers to follow when interfacing a digital loop carrier with a class V central office switch. These requirements are collected in Bellcore document TR-303.

One of the optional requirements of TR-303 concerns assembly of a plurality of Integrated Services Digital Network (ISDN) D-channel signals into a single DS0 signal. This option of TR-303 now requires that up to four ISDN D-channel signals be multiplexed together to form a single DS0 signal for transport from a digital loop carrier to a class V central office switch. The regional bell operating companies now require that this option be made available.

An ISDN signal comprises two B-channel and one D-channel signal. Each B-channel signal comprises an 8-bit signal while the D-channel signal comprises a 2-bit signal. Because the 8-bit DS0 signal has been the traditional base unit of transport for the telephone system, ISDN D-channel signals often consume an entire 8-bit DS0 signal. Transporting individual D-channel signals in a DS0 signal wastes three-fourths of the bandwidth for that particular DS0.

The optional requirement of TR-303 discussed above seeks to utilize bandwidth more efficiently. In accordance with TR-303, one to four ISDN D-channel signals may be multiplexed together and carried in a single DS0 signal between the digital loop carrier and the central office class V switch. This TR-303 requirement reduces wasted bandwidth between a digital loop carrier and a class V central office switch, particularly where a large number of ISDN lines are connected to the digital loop carrier.

SUMMARY OF THE INVENTION

One aspect of the invention is a method and apparatus for multiplexing ISDN D-channel signals into multiplexed signals. Another aspect of the invention is a digital communications terminal that assembles ISDN D-channel signals in accordance with the method of the invention. The method comprises receiving a frame of communication signals wherein some of the communication signals represent ISDN D-channel signals wherein each ISDN D-channel signal is represented by a first number of data bits and a second number of other bits. A frame of communication signals is stored in memory during a first frame period. During a second frame period at least some of the stored communication signals are retrieved from memory. Multiplexed signals are then assembled wherein each multiplexed signal comprises a multiplexed combination of the data bits of ISDN D-channel signals retrieved from memory. These multiplexed signals are output during the second frame period. In accordance with another aspect of the invention, multiplexing of ISDN D-channel signals is achieved by reading the time slot interchanger memory multiple times during a time slot period of a communications frame.

The invention has several important technical advantages. The invention allows a digital loop carrier to meet an optional requirement of TR-303 for ISDN D-channel assembly. Assembly may be accomplished using the time slot interchanger of the digital loop carrier. Utilization of the time slot interchanger for D-channel assembly makes efficient use of the digital loop carrier's hardware because the time slot interchanger may also be used in its traditional time slot interchange role. The invention allows the manufacturer of an existing digital loop carrier to easily redesign its time slot interchanger in a time and cost efficient manner in order to meet the relevant optional requirements of TR-303. The invention achieves multiplexing of D-channel signals without adding additional frames of time delay to the D-channel signals.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

Figure 1:
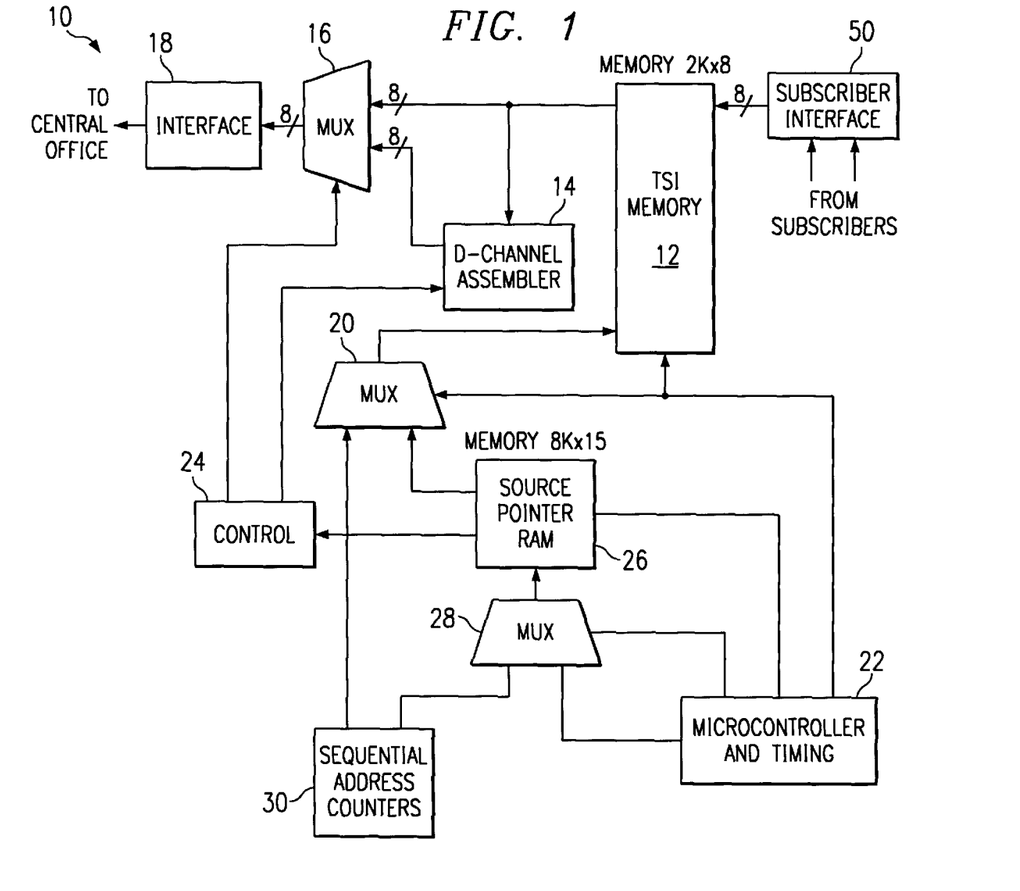
FIG. 1 illustrates the time slot interchanger portion of a digital communications terminal constructed in accordance with the invention.

FIG. 1 illustrates an embodiment of a time slot interchanger 10 that may be used to multiplex ISDN D-channel signals in accordance with the invention. For purposes of this description, the terms "D-channel" and "¼ DS0" are used interchangeably and refer to the 2-bit portion of an ISDN signal. Time slot interchanger 10 is capable of performing a time slot interchange function on a plurality of signals received from a subscriber interface and sent to a central office interface. Although this function will not be described in detail, it should be understood that time slot interchanger 10 may perform any function performed by an existing time slot interchanger as well as performing the functions of the invention. For example, time slot interchanger 10 may employ the power conservation techniques disclosed in U.S. Pat. No. 5,260,937 issued to Thomas R. Eames and Lac Trinh and assigned to DSC Communications Corporation, which is hereby incorporated by reference as if fully set forth herein. Although this example performs assembly of D-channel signals between subscribers and a central office, the invention could be used anywhere in a communications network.

Time slot interchanger 10 comprises time slot interchanger memory 12, D-channel assembler 14, multiplexer 16 and interface 18. Time slot interchanger memory 12, in this example, is a 2K by 8 memory which may be used for interchanging over 2,000 DS0 communication signals. Time slot interchanger memory 12 receives signals from a subscriber interface (not explicitly shown). In this embodiment, DS0s are written into time slot interchanger memory 12 in consecutive order and read out of time slot interchanger memory 12 in random order to achieve the time slot interchange function. Some of the signals received from the subscriber interface and written into time slot interchanger memory 12 are ISDN D-channel signals. ISDN D-channel signals are output by time slot interchanger memory 12 and received by D-channel assembler 14. D-channel assembler 14 multiplexes between one and four D-channel signals into a multiplexed DS0 signal. Multiplexer 16 feeds either the output of time slot interchanger memory 12 or D-channel assembler 14 to interface 18. Interface 18 then sends the appropriate signal at the appropriate time to the central office switch. The invention accomplishes the multiplexing of ¼ DS0 signals by reading a D-channel signal from time slot interchanger memory 12 up to four times during a single time slot period and sending each D-channel signal to D-channel assembler 14 to be assembled during that time slot. Thus, time slot interchanger 10 can multiplex a D-channel signal into a DS0 signal and pass it to interface 18 or send a DS0 signal to interface 18 during a time slot. Time slot interchanger 10 also includes control circuitry which controls time slot interchanger memory 12, D-channel assembler 14, and/or multiplexer 16. The control circuitry includes multiplexer 20, microcontroller and timing circuitry 22, control circuitry 24, source pointer RAM 26, multiplexer 28, and sequential address counters 30.

Microcontroller and timing circuitry 22 oversees the control and timing of time slot interchanger 10. Microcontroller and timing circuitry 22 controls the interchange of time slots utilizing source pointers stored in the appropriate locations in source pointer RAM 26. Multiplexer 28 provides an address to source pointer RAM 26 either from microcontroller and timing circuitry 22, or from sequential address counters 30. Source pointer RAM 26 receives its address from microcontroller and timing circuitry 22 when the digital communications terminal is setting up a connection for a particular time slot. Microcontroller and timing circuitry 22 stores the appropriate pointer in source pointer RAM 26. During the operation of time slot interchanger 10, source pointer RAM 26 receives its address input from sequential address counters 30.

Time slot interchanger memory 12 receives its address input from multiplexer 20. Multiplexer 20 provides either the output of sequential address counters 30 or source pointer RAM 26 as the address input to time slot interchanger memory 12. Because time slot interchanger 10 comprises a consecutive write/random read time slot interchanger, time slot interchanger memory 12 receives its address inputs from sequential address counters 30 while data is being written to time slot interchanger memory 12 and receives its address inputs from source pointer RAM 26 when data is being read from time slot interchanger memory 12.

Control circuitry 24 determines whether the output of time slot interchanger memory 12 or D-channel assembler 14 is passed to interface 18. As will be more fully described below, control circuitry 24 also provides the appropriate control signals to allow assembly of D-channel signals in D-channel assembler 14.

In operation, a digital communications terminal receives a frame of communication signals wherein some of the communication signals represent ISDN D-channel signals. The frame of communication signals is stored in time slot interchanger memory 12 during a first frame period. Time slot interchanger memory 12 receives the frame through a subscriber interface 50. During a second frame period, at least some of the stored communication signals are retrieved from time slot interchanger memory 12. Ordinary DS0 signals to be sent to the central office are retrieved during the proper time slot of the second frame and sent directly from time slot interchanger memory 12 to interface 18 through multiplexer 16. Multiplexer 16 will pass the output of time slot interchanger memory 12 to interface 18 when the particular time slot in question is to contain an ordinary DS0 signal.

To assemble up to four D-channel signals into a single DS0 in accordance with the invention, time slot interchanger memory 12 may be read up to four times during a time slot. D-channel assembler 14 assembles the multiplexed DS0 using the communications signal data read out during these four memory accesses. At the end of the time slot, interface 18 receives the output of D-channel assembler 14 after it has passed through multiplexer 16. Interface 18 may latch the data in or pass it through to other circuitry. Multiplexer 16 will pass the output of D-channel assembler 14 to interface 18 when the time slot in question contains a multiplexed D-channel signal. Interface 18 may then send the data in either serial or parallel form to a central office interface or to the central office itself.

In this embodiment, each time slot in a frame for time slot interchanger 10 is associated with four source pointers in source pointer RAM 26. Each source pointer in this embodiment is 15 bits wide. Thus, source pointer RAM 26 comprises an 8K by 15 memory.

Each source pointer comprises a series of address bits indicating the source address—11 bits in this example for a 2K by 2K time slot interchanger. The source pointer further comprises D-channel source bits (three bits in this embodiment) indicating which bit pair within a byte containing a D-channel signal contains the D-channel information. In other words, the invention allows the D-channel information to be placed in bits 0:1, 1:2, 2:3, 3:4, 4:5, 5:6, 6:7, or 7:0 of the DS0 signal received from a subscriber. This feature of the invention allows flexibility in designing interface circuitry for subscribers. The source pointer in this embodiment also includes a control bit indicating whether a particular byte to be read is a DS0 or a D-channel signal. This control bit may be used to control multiplexer 16 as well as D-channel assembler 14. Other bits could be included or some of the described bits omitted from the source pointer without departing from the scope of the invention. To save power, the first source pointer read during a DS0 period can disable subsequent reading of source pointers if a DS0 signal is indicated.

For ordinary DS0s, time slot interchanger 10 may either read the same memory location four times during a particular time slot such that the first three reads of time slot interchanger memory 12 are ignored and the fourth read is sent through multiplexer 16 to interface 18 at the appropriate time. Alternatively, control circuitry 24 could generate wait states for the clock driving time slot interchanger memory 12. Wait states could be used to generate a single read of time slot interchanger memory 12 during a time slot that contains an ordinary DS0. In either case, the data from time slot interchanger memory 12 may be transferred to interface 18 through multiplexer 16 at the end of the time slot. If the speed of the circuitry of interface 18 becomes a problem, then multiplexer 16 could latch the appropriate data at the end of a time slot.

For D-channel signals, the D-channel source bits of the source pointer specify the pair of consecutive bits (potentially including bit pair 7 and 0) where the D-channel information is located for a particular memory location. Time slot interchanger 10 causes the full 8 bits to be read from that memory location in time slot interchanger memory 12 and sent to D-channel assembler 14. Alternatively, control circuitry could be designed to cause only the relevant 2 bits to be read from time slot interchanger memory 12.

Figure 2:
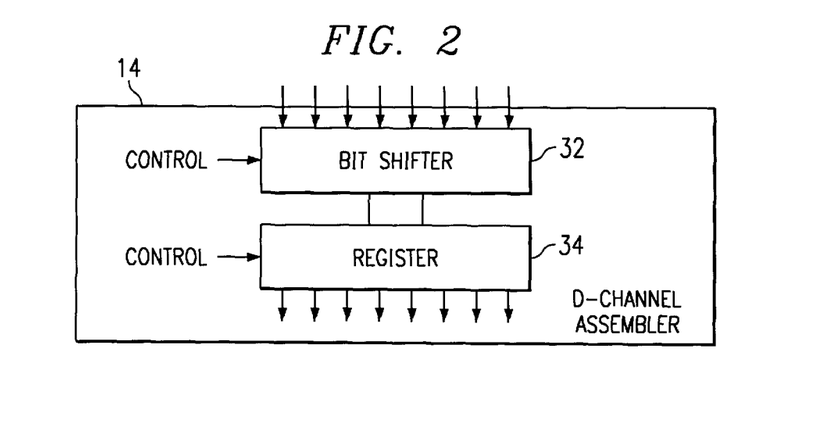
FIG. 2 illustrates an embodiment of a D-channel assembler that may be used in the time slot interchanger of FIGS. 1 and 3.

FIG. 2 illustrates an example of a D-channel assembler 14 that can be used in time slot interchanger 10. Other D-channel assemblers 14 could be used without departing from the scope of the invention. D-channel assembler 14 comprises bit shifter 32 and register 34. Bit shifter 32 shifts the selected bits indicated by the D-channel source pointer bits to the 2-bit output of bit shifter 32. Bit shifter 32 is capable of shifting any pair of consecutive bits (potentially including bit pair 7 and 0) to the output of bit shifter 32 based upon control signals it receives.

After the appropriate bits have been shifted to the output of bit shifter 32, register 34 latches the 2 bits into an appropriate position in register 34. In this embodiment, the circuitry controlling register 34 simply counts from 0 to 3 (denoting the four positions in a multiplexed DS0 signal) and places the 2-bit output of bit shifter 32 into consecutive positions in register 34. In other words, a time slot for time slot interchanger 10 can be broken up into four sub-time slots. During the first sub-time slot, the output of bit shifter 32 is latched into the least significant 2 bits of register 34. During the second sub-time slot, the output of bit shifter 32 is latched into the third and fourth bits of register 34. This process continues until an entire DS0 signal has been assembled at the end of the time slot. Alternatively, two additional bits could be added to the source pointer and control circuitry could cause the 2-bit output from bit shifter 32 to be placed into one of the four bit pair positions of register 34 based upon these two source pointer bits.

Time slot interchanger memory 12 could be divided into a section for odd frames and a section for even frames as is commonly known in the art. This technique could be used with any of the embodiments discussed herein.

Focusing now on the processing of an entire frame, each of a series of repetitive frames of communication signals received from a subscriber interface are stored consecutively in time slot interchanger memory 12. During a second frame period, these communication signals are read out of time slot interchanger memory 12 in a random order in order to achieve interchange of those signals. For a given time slot in the frame that is sent to the central office, interface 18 will either receive an ordinary DS0 signal or a multiplexed signal comprising a plurality of multiplexed ISDN D-channel signals. Interface 18 receives the appropriate signals in the order dictated by the source pointers stored in source pointer RAM 26.

Because time slot interchanger memory 12 is being read four times as fast as it is being written, two sequential address counters 30 may be used for time slot interchanger 10. Alternatively, one sequential address counter 30 running fast enough for reading data from time slot interchanger memory 12 could be used and the two least significant bits of this counter could be ignored for purposes of writing data to time slot interchanger memory 12.

Figure 3:
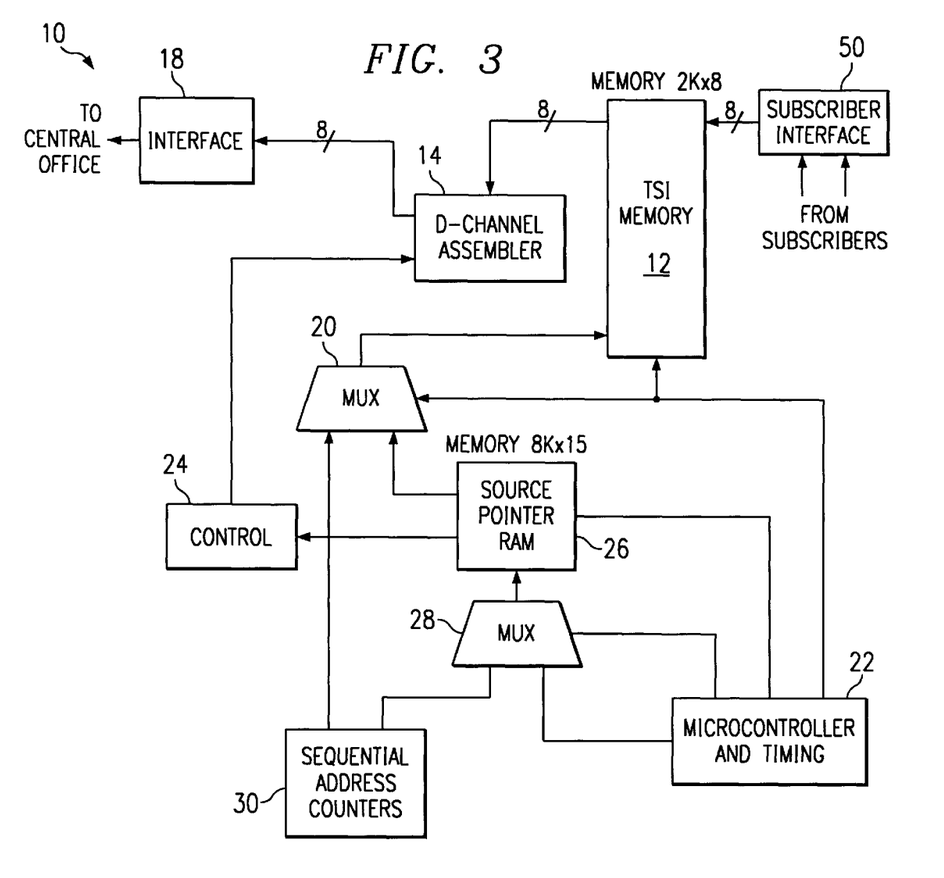
FIG. 3 illustrates a block diagram of another embodiment of a time slot interchanger portion of a digital communications terminal constructed in accordance with the invention.

FIG. 3 illustrates a second embodiment of a time slot interchanger 10 that may be used in a digital communications terminal to multiplex ISDN D-channel signals into multiplexed signals in accordance with the invention. Time slot interchanger 10 of FIG. 3 differs from the embodiment illustrated in FIG. 1 in that the output of time slot interchanger memory 12 is coupled to D-channel assembler 14, while multiplexer 16 is omitted. Ordinary DS0 signals also pass through D-channel assembler 14. The differences between the embodiment of time slot interchanger 10 of FIG. 3 and the embodiment of FIG. 1 can best be understood by examining the operation of the embodiment illustrated in FIG. 3.

In the embodiment illustrated in FIG. 3, D-channel assembly takes place in the same manner as described for the embodiment illustrated in FIG. 1. Here, however, multiplexer 16 has been eliminated and the output of D-channel assembler 14 is sent to interface 18 at the end of a time slot. Ordinary DS0 signals are handled differently than in the embodiment illustrated in FIG. 1. In this embodiment, each DS0 is treated similarly to multiplexed D-channel signals. In order to send a DS0 to the central office in a particular time slot, that DS0 should be sent to interface 18 at the appropriate time. To accomplish this, the memory location in time slot interchanger memory 12 containing the DS0 received from the subscriber interface is read four times during the appropriate time slot. D-channel assembler 14 treats the DS0 as four pieces and reassembles the DS0. In other words, the first time that the memory location is read, bits 0 and 1 are shifted to the output of bit shifter 32 in D-channel assembler 14 based upon the D-channel source bits from the source pointer. These bits are then latched into bits 0 and 1 of register 34. Next, bits 2 and 3 are shifted to the output of bit shifter 32 and latched into bits 2 and 3 of register 34, and so on.

By essentially breaking up a DS0 and then rebuilding it, a bit can be eliminated from each source pointer and the control circuitry simplified. The bit indicating whether the source pointer is for a DS0 or D-channel signal is unnecessary with this embodiment. This simplification is achieved because ordinary DS0s are treated similarly to D-channel signals. Note that four source pointers, each with the same address, should be used to access an ordinary DS0 in time slot interchanger memory 12.

The variations for D-channel assembler 14 discussed above in connection with FIG. 1 may also be used in the embodiment of time slot interchanger 10 in FIG. 3. Similarly, further alternatives to the embodiment of D-channel assembler 14 illustrated in FIG. 2 could also be used.

Figure 4:
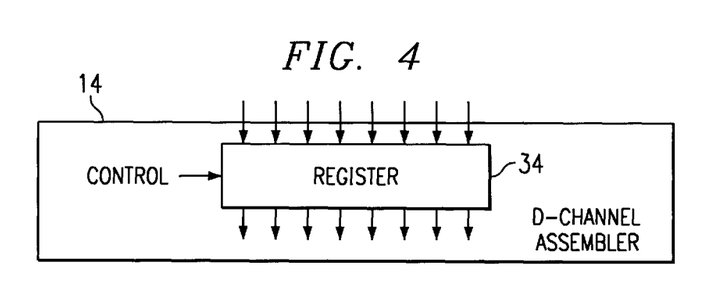
FIG. 4 illustrates another embodiment of a D-channel assembler that may be used with the time slot interchangers of FIGS. 1 and 3.

FIG. 4 illustrates an alternative embodiment of D-channel assembler 14 that could be used in the time slot interchanger 10 of either FIG. 1 or FIG. 3. In this embodiment of D-channel assembler 14, the D-channel signals have been placed in the proper 2-bit position for output to interface 18 before they are even received by time slot interchanger 10. For example, the D-channel signals may be placed in the proper 2 bit position by ISDN line cards or by the subscriber interface of the digital communications terminal. The "proper 2-bit position" refers to the position of the D-channel signal after it has passed through time slot interchanger 10 and has been placed in a multiplexed DS0 signal for transmission to the central office through interface 18. Line cards may be made programmable such that any ISDN D-channel signal can be placed into bits 0:1, 2:3, 4:5 or 6:7 of a DS0 for transport to the digital communications terminal. At time slot interchanger 10, a D-channel assembler may still be used to assemble four D-channels into a DS0 signal, but because the D-channel signals are already in proper position within the byte, shifter 32 can be omitted in this embodiment of D-channel assembler 14. Instead, an 8-bit register 34 is used. Register 34 can be controlled to read only 2 bits at a time. The source pointer for this embodiment may omit the D-channel source bits as the D-channel data bits already are in proper position for transmission to the central office when received by time slot interchanger memory 12. D-channel assembler 14 could be used with either embodiment of time slot interchanger 10 illustrated in FIG. 1 or 3.

It should be understood that the term "control circuitry" is a broad term referring simply to circuitry used to control other circuitry. The term is broadly intended to include the direct use of bits from source pointer RAM 26 to control time slot interchanger 10. The term, "latching," in this application is also used broadly to refer to the act of storing data for a period of time. The term refers to capturing of data whether components such as register 34 actually latch data using a latching function, latch data using a flip flop type function, or latch data in some other manner.

One embodiment of the invention involves storing data bits of ISDN D-channel signals in time slot interchanger memory 12 in the same positions that those signals will occupy within one of the multiplexed signals. The term "same position" refers to the position of data bits within time slot interchanger memory 12 relative to other data bits. Time slot interchanger memory 12 could also include other bits such as error detection/correction bits without departing from the scope of the invention. The data bits of a D-channel signal could be placed in all four 2-bit positions in a DS0 signal before being sent to time slot interchanger 10 through the subscriber interface. This alternative might simplify the implementation of time slot interchanger 10.

Although the invention is illustrated in the context of assembling D-channel signals from subscribers destined for a central office, the invention could be used at any point in a telecommunications system. For example, assembly could occur within a class V central office switch itself.

Although the present invention has been described in detail, it should be understood that various changes, substitutions, and alterations can be made hereto without departing from the spirit and scope of the invention as defined by the appended claims.

What is claimed is:

1. A time slot interchanger, comprising:
    a first interface operable to receive a first frame of communication signals, wherein some of the communication signals represent ISDN D-channel signals, each ISDN D-channel signal represented by a first number of data bits and a second number of other bits;
    a memory coupled to the first interface and operable to store the first frame of communication signals during a first frame period;
    control circuitry coupled to the memory and operable to cause the memory to output at least some of the stored communication signals during a second frame period;
    a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory; and
    a second interface selectively coupled to the D-channel assembler and the memory as determined by the control circuitry, the second interface operable to transmit a second frame of communication signals during the second frame period, the second frame of communication signals including the multiplexed signals from the D-channel assembler and the first frame of communication signals from the memory.

2. The time slot interchanger of claim 1, further comprising:
    a multiplexer having a first input, a second input, and an output and controlled by the control circuitry, the first input coupled to the memory, the second input coupled to the D-channel assembler, and the output coupled to the second interface, the multiplexer operable to select the first input or second input in response to one or more bits of a source pointer.

3. The time slot interchanger of claim 1, wherein the D-channel assembler receives all of the output communication signals, the D-channel assembler further operable to assemble DS0 signals, each DS0 signal assembled by receiving an output communication signal four consecutive times and selecting and storing a unique pair of bits of the DS0-type output communication signal each of the four times it is received.

4. A time slot interchanger, comprising:
    a first interface operable to receive a first frame of communication signals, wherein some of the communication signals represent ISDN D-channel signals, each ISDN D-channel signal represented by a first number of data bits and a second number of other bits;
    a memory coupled to the first interface and operable to store the first frame of communication signals during a first frame period;
    control circuitry coupled to the memory and operable to cause the memory to output at least some of the stored communication signals during a second frame period;
    a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory; and
    a second interface selectively coupled to the D-channel assembler and the memory as determined by the control circuitry, the second interface operable to transmit a second frame of communication signals during the second frame period, the second frame of communication signals including the multiplexed signals, wherein the D-channel assembler further comprises:
    a shifter coupled to the memory and controlled by the control circuitry, the shifter operable to receive an output communication signal and produce a shifted output comprising two selected bits of the output communication signal, wherein the two selected bits are selected in response to one or more bits of a source pointer associated with the memory location from which the output communication signal was output;

a register coupled to the shifter and controlled by the control circuitry, the register operable to receive the shifted output and assemble multiplexed signals by sequentially latching each of a plurality of shifter outputs into one of a plurality of subchannels of the register.

5. A time slot interchanger, comprising:

a first interface operable to receive a first frame of communication signals, wherein some of the communication signals represent ISDN D-channel signals, each ISDN D-channel signal represented by a first number of data bits and a second number of other bits:

a memory coupled to the first interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory; and a second interface selectively coupled to the D-channel assembler and the memory as determined by the control circuitry, the second interface operable to transmit a second frame of communication signals during the second frame period, the second frame of communication signals including the multiplexed signals, wherein the first number of data bits of each communication signal received by the first interface that represent an ISDN D-channel signal are positioned within the memory such that those bits will occupy the same position within one of the multiplexed signals; and wherein the D-channel assembler further comprises a register coupled to the memory and controlled by the control circuitry, the register operable to receive an output communication signal and assemble multiplexed signals by sequentially latching selected data bits of a plurality of the output communication signals into one of a plurality of subchannels of the register.

6. A time slot interchanger, comprising:

a first interface operable to receive a first frame of communication signals, wherein some of the communication signals represent ISDN D-channel signals, each ISDN D-channel signal represented by a first number of data bits and a second number of other bits;

a memory coupled to the first interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory;

a second interface selectively coupled to the D-channel assembler and the memory as determined by the control circuitry, the second interface operable to transmit a second frame of communication signals during the second frame period, the second frame of communication signals including the multiplexed signals;

a multiplexer having a first input, a second input, and an output and controlled by the control circuitry, the first input coupled to the memory, the second input coupled to the D-channel assembler, and the output coupled to the second interface, the multiplexer operable to select the first input or second input in response to one or more bits of a source pointer, wherein the D-channel assembler further comprises:

a shifter coupled to the memory and controlled by the control circuitry, the shifter operable to receive an output communication signal and produce a shifter output comprising two selected bits of the output communication signal, wherein the two selected bits are selected in response to one or more bits of a source pointer associated with the memory location from which the output communication signal was output;

a register coupled to the shifter and controlled by the control circuitry, the register operable to receive the shifter output and assemble multiplexed signals by sequentially latching each of a plurality of shifter outputs into one of a plurality of subchannels of the register.

7. A time slot interchanger, comprising:

a first interface operable to receive a first frame of communication signals, wherein some of the communication signals represent ISDN D-channel signals, each ISDN D-channel signal represented by a first number of data bits and a second number of other bits;

a memory coupled to the first interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory;

a second interface selectively coupled to the D-channel assembler and the memory as determined by the control circuitry, the second interface operable to transmit a second frame of communication signals during the second frame period, the second frame of communication signals including the multiplexed signals;

a multiplexer having a first input, a second input, and an output and controlled by the control circuitry, the first input coupled to the memory, the second input coupled to the D-channel assembler, and the output coupled to the second interface, the multiplexer operable to select the first input or second input in response to one or more bits of a source pointer, wherein the first number of data bits of each communication signal received by the first interface that represent an ISDN D-channel signal are positioned within the memory such that those bits will occupy the same position within one of the multiplexed signals; and wherein the D-channel assembler further comprises a register coupled to the memory and controlled by the control circuitry, the register operable to receive an output communication signal and assemble multiplexed signals by sequentially latching selected data bits of a plurality of the output communication signals into one of a plurality of subchannels of the register.

8. A time slot interchanger, comprising:

a first interface operable to receive a first frame of communication signals, wherein some of the communication signals represent ISDN D-channel signals, each ISDN D-channel signal represented by a first number of data bits and a second number of other bits;

a memory coupled to the first interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory; and a second interface selectively coupled to the D-channel assembler and the memory as determined by the control circuitry, the second interface operable to transmit a second frame of communication signals during the second frame period, the second frame of communication signals including the multiplexed signals, wherein the D-channel assembler receives all of the output communication signals, the D-channel assembler further operable to assemble DS0 signals, each DS0 signal assembled by receiving an output communication signal four consecutive times and selecting and storing a unique pair of bits of the DS0-type output communication signal each of the four times it is received, wherein the D-channel assembler further comprises:

a shifter coupled to the memory and controlled by the control circuitry, the shifter operable to receive an output communication signal and produce a shifter output comprising two selected bits of the output communication signal, wherein the two selected bits are selected in response to one or more bits of a source pointer associated with the memory location from which the output communication signal was output;

a register coupled to the shifter and controlled by the control circuitry, the register operable to receive the shifter output and assemble multiplexed signals by sequentially latching each of a plurality of shifter outputs into one of a plurality of subchannels of the register.

9. A time slot interchanger, comprising:

a first interface operable to receive a first frame of communication signals, wherein some of the communication signals represent ISDN D-channel signals, each ISDN D-channel signal represented by a first number of data bits and a second number of other bits;

a memory coupled to the first interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each multiplexed signal comprising a multiplexed combination of the data bits of ISDN D-channel signals output by the memory; and a second interface selectively coupled to the D-channel assembler and the memory as determined by the control circuitry, the second interface operable to transmit a second frame of communication signals during the second frame period, the second frame of communication signals including the multiplexed signals, wherein the D-channel assembler receives all of the output communication signals, the D-channel assembler further operable to assemble DS0 signals, each DS0 signal assembled by receiving an output communication signal four consecutive times and selecting and storing a unique pair of bits of the DS0-type output communication signal each of the four times it is received, wherein the first number of data bits of each communication signal received by the first interface that represent an ISDN D-channel signal are positioned within the memory such that those bits will occupy the same position within one of the multiplexed signals; and wherein the D-channel assembler further comprises a register coupled to the memory and controlled by the control circuitry, the register operable to receive an output communication signal and assemble multiplexed signals by sequentially latching selected data bits of a plurality of the output communication signals into one of a plurality of subchannels of the register.

10. A digital communications terminal, comprising:

a subscriber link;

a central office link;

a time slot interchanger including:

a first time slot interchanger interface coupled to the subscriber link and operable to receive a stream of input frames, the input frames including a first frame of communication signals, wherein some of the communication signals represent ISDN D-channel signals, each ISDN D-channel signal represented by a first number of data bits and a second number of other bits;

memory coupled to the first time slot interchanger interface and operable to store the first frame of communication signals during a first frame period;

control circuitry coupled to the memory and operable to cause the memory to output at least some of the stored communication signals during a second frame period;

a D-channel assembler coupled to the memory and controlled by the control circuitry and operable to receive at least some of the output communication signals and assemble multiplexed signals, each assembled multiplexed signal comprising a multiplexed combination of the data bits of ISDN D-channel signals output by the memory; and a second time slot interchanger interface selectively coupled to the D-channel assembler and the memory as determined by the control circuitry, the second time slot interchanger interface coupled to the central office link and operable to transmit the stream of output frames, including a second frame of communication signals during the second frame period, the second frame of communication signals including the assembled multiplexed signals from the D-channel assembler and the first frame of communication signals from the memory.

11. The digital communications terminal of claim 10, the time slot interchanger further comprising:

a multiplexer having a first input, a second input, and an output and controlled by the control circuitry, the first input coupled to the memory, the second input coupled to the D-channel assembler, and the output coupled to the second time slot interchanger interface, the multiplexer operable to select the first input or second input in response to one or more bits of a source pointer.

12. The digital communications terminal of claim 10, wherein the D-channel assembler receives all of the output communication signals, the D-channel assembler further operable to assemble DS0 signals, each DS0 signal assembled by receiving an output communication signal four consecutive times and selecting and storing a unique pair of bits of the DS0-type output communication signal each of the four times it is received.

13. A digital communications terminal, comprising:
a subscriber link;
a central office link;
a time slot interchanger including:
a first time slot interchanger interface coupled to the subscriber link and operable to receive a stream of input frames, the input frames including a first frame of communication signals, wherein some of the communication signals represent ISDN D-channel signals, each ISDN D-channel signal represented by a first number of data bits and a second number of other bits;
memory coupled to the first time slot interchanger interface and operable to store the first frame of communication signals during a first frame period;
control circuitry coupled to the memory and operable to cause the memory to output at least some of the stored communication signals during a second frame period;
a D-channel assembler coupled to the memory and controlled by the control circuitry and operable to receive at least some of the output communication signals and assemble multiplexed signals, each assembled multiplexed signal comprising a multiplexed combination of the data bits of ISDN D-channel signals output by the memory; and
a second time slot interchanger interface selectively coupled to the D-channel assembler and the memory as determined by the control circuitry, the second time slot interchanger interface coupled to the central office link and operable to transmit the stream of output frames, including a second frame of communication signals during the second frame period, the second frame of communication signals including the assembled multiplexed signals, wherein the D-channel assembler further comprises:
a shifter coupled to the memory and controlled by the control circuitry, the shifter operable to receive an output communication signal and produce a shifter output comprising two selected bits of the output communication signal, wherein the two selected bits are selected in response to one or more bits of a source pointer associated with the memory location from which the output communication signal was output;
a register coupled to the shifter and controlled by the control circuitry, the register operable to receive the shifter output and assemble multiplexed signals by sequentially latching each of a plurality of shifter outputs into one of a plurality of subchannels of the register.

14. A digital communications terminal, comprising:
a subscriber link;
a central office link;
a time slot interchanger including:
a first time slot interchanger interface coupled to the subscriber link and operable to receive a stream of input frames, the input frames including a first frame of communication signals, wherein some of the communication signals represent ISDN D-channel signals, each ISDN D-channel signal represented by a first number of data bits and a second number of other bits;
memory coupled to the first time slot interchanger interface and operable to store the first frame of communication signals during a first frame period;
control circuitry coupled to the memory and operable to cause the memory to output at least some of the stored communication signals during a second frame period;
a D-channel assembler coupled to the memory and controlled by the control circuitry and operable to receive at least some of the output communication signals and assemble multiplexed signals, each assembled multiplexed signal comprising a multiplexed combination of the data bits of ISDN D-channel signals output by the memory; and
a second time slot interchanger interface selectively coupled to the D-channel assembler and the memory as determined by the control circuitry, the second time slot interchanger interface coupled to the central office link and operable to transmit the stream of output frames, including a second frame of communication signals during the second frame period, the second frame of communication signals including the assembled multiplexed signals, wherein the first number of data bits of each communication signal received by the first time slot interchanger interface that represent an ISDN D-channel signal are positioned within the memory such that those bits will occupy the same position within one of the multiplexed signals; and
wherein the D-channel assembler further comprises a register coupled to the memory and controlled by the control circuitry, the register operable to receive an output communication signal and assemble multiplexed signals by sequentially latching selected data bits of a plurality of the output communication signals into one of a plurality of subchannels of the register.

15. A method for multiplexing ISDN D-channel signals into multiplexed signals, comprising:
receiving a frame of communication signals, wherein some of the communication signals represent ISDN D-channel signals, each ISDN D-channel signal represented by a first number of data bits and a second number of other bits;
storing the frame of communication signals in memory during a first frame period;
retrieving at least some of the stored communication signals from a memory during a second frame period;
assembling multiplexed signals, the multiplexed signals including a multiplexed combination of the data bits of ISDN D-channel signals retrieved from the memory; and
selectively outputting the multiplexed signals and the stored frame of communication signals during the second frame period.

16. The method of claim 15, wherein the multiplexed signals are assembled using a D-channel assembler; the method further comprising:

multiplexing the output of the D-channel assembler and the output of memory in response to a source pointer to produce a selected output; and wherein the outputting step further comprises outputting the selected output during the second frame period.

17. The method of claim 15, further comprising:

assembling DS0 signals, each DS0 signal assembled by retrieving a communication signal from memory four consecutive times and selecting and storing a unique pair of bits of the communication signal each of the four times it is retrieved.

18. The method of claim 15, wherein the assembly of a multiplexed signal takes place during a single time slot of a frame period.

19. The method of claim 15, wherein the first number equals the second number.

20. A method for multiplexing ISDN D-channel signals into multiplexed signals, comprising:

receiving a frame of communication signals, wherein some of the communication signals represent ISDN D-channel signals, each ISDN D-channel signal represented by a first number of data bits and a second number of other bits;

storing the frame of communication signals in memory during a first frame period;

retrieving at least some of the stored communication signals from a memory during a second frame period;

assembling multiplexed signals, each multiplexed signal comprising a multiplexed combination of the data bits of ISDN D-channel signals retrieved from the memory; and outputting the multiplexed signals during the second frame period, wherein the multiplexed signals are assembled using a D-channel assembler comprising:

a shifter coupled to the memory and controlled by control circuitry, the shifter operable to receive a retrieved communication signal and produce a shifter output comprising two selected bits of the retrieved communication signal, wherein the two selected bits are selected in response to one or more bits of a source pointer associated with the memory location from which the retrieved communication signal was retrieved;

a register coupled to the shifter and controlled by the control circuitry, the register operable to receive the shifter output and assemble multiplexed signals by sequentially latching each of a plurality of shifter outputs into one of a plurality of subchannels of the register.

21. A method for multiplexing ISDN D-channel signals into multiplexed signals, comprising:

receiving a frame of communication signals, wherein some of the communication signals represent ISDN D-channel signals, each ISDN D-channel signal represented by a first number of data bits and a second number of other bits;

storing the frame of communication signals in memory during a first frame period;

retrieving at least some of the stored communication signals from a memory during a second frame period;

assembling multiplexed signals, each multiplexed signal comprising a multiplexed combination of the data bits of ISDN D-channel signals retrieved from the memory; and outputting the multiplexed signals during the second frame period, wherein the first number of data bits of each received communication signal that represents an ISDN D-channel signal are positioned within the memory such that those bits will occupy the same position within one of the multiplexed signals;

wherein the multiplexed signals are assembled using a D-channel assembler, comprising a register coupled to the memory and controlled by control circuitry, the register operable to receive a retrieved communication signal and assemble multiplexed signals by sequentially latching selected data bits of a plurality of the retrieved communication signals into one of a plurality of subchannels of the register.

* * * * *